US011986121B2

(12) United States Patent
Zhou (10) Patent No.: US 11,986,121 B2
(45) Date of Patent: May 21, 2024

(54) BREWING ARRANGEMENT AND PORTABLE COFFEE MACHINE

(71) Applicant: Lingyun (Ningbo) Technology Co., Ltd, Ningbo (CN)

(72) Inventor: Wenyu Zhou, Ningbo (CN)

(73) Assignee: LINGYUN (NINGBO) TECHNOLOGY CO., LTD, Ningbo (CN)

( * ) Notice: Subject to any disclaimer, the term of this patent is extended or adjusted under 35 U.S.C. 154(b) by 0 days.

(21) Appl. No.: 18/451,936

(22) Filed: Aug. 18, 2023

(65) Prior Publication Data

US 2023/0404315 A1    Dec. 21, 2023

(30) Foreign Application Priority Data

Jul. 26, 2023    (CN) .......................... 202321996015.9

(51) Int. Cl.
*A47J 31/00*    (2006.01)
*A23F 5/26*    (2006.01)
*A47J 31/06*    (2006.01)
*A47J 31/44*    (2006.01)

(52) U.S. Cl.
CPC ............. *A47J 31/005* (2013.01); *A23F 5/262* (2013.01); *A47J 31/0663* (2013.01); *A47J 31/4403* (2013.01)

(58) Field of Classification Search
CPC .. A47J 31/005; A47J 31/0663; A47J 31/4403; A23F 5/262
See application file for complete search history.

(56) References Cited

U.S. PATENT DOCUMENTS

| | | | | |
|---|---|---|---|---|
| 9,402,501 | B1* | 8/2016 | Vu | A47J 31/407 |
| 10,531,763 | B1* | 1/2020 | Backstrom | A47J 31/446 |
| 11,006,777 | B1* | 5/2021 | Weber | A47J 31/5251 |
| 11,832,755 | B2* | 12/2023 | Rivera | B65D 85/8049 |
| 2010/0116143 | A1* | 5/2010 | Cerroni | A47J 31/38 99/297 |
| 2011/0256289 | A1 | 10/2011 | Steiner | |
| 2012/0118164 | A1 | 5/2012 | Tonelli et al. | |

(Continued)

FOREIGN PATENT DOCUMENTS

KR    20160040946    *    4/2016

OTHER PUBLICATIONS

English Translation for KR20160040946 published Apr. 15, 2016.*

*Primary Examiner* — Anthony J Weier
(74) *Attorney, Agent, or Firm* — Zhigang Ma (57) ABSTRACT

A brewing arrangement and a portable coffee machine, the portable coffee machine includes a main body, a coffee receiving cup, and a brewing arrangement including a brewing assembly having a brewing chamber, and a powder pressing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the main body to be pumped into the brewing assembly to brew the coffer powder, so as to provide liquid coffee product which is collected by the coffee receiving cup under the brewing assembly.

13 Claims, 6 Drawing Sheets

(56) References Cited

U.S. PATENT DOCUMENTS

| | | | |
|---|---|---|---|
| 2013/0243919 A1* | 9/2013 | Shrader | A47J 31/32 |
| | | | 426/433 |
| 2017/0280926 A1* | 10/2017 | Khalifa | B65D 85/72 |
| 2019/0191918 A1 | 6/2019 | Ceotto et al. | |
| 2019/0269273 A1* | 9/2019 | Castillo Redondo | |
| | | | A47J 31/0626 |
| 2020/0093313 A1* | 3/2020 | Larsen | A47J 31/18 |
| 2023/0148786 A1* | 5/2023 | Yiu | A47J 31/0636 |
| | | | 99/287 |
| 2023/0210300 A1* | 7/2023 | Wahhas | A47J 31/0673 |
| | | | 99/295 |
| 2023/0309734 A1* | 10/2023 | Sa | A47J 31/461 |
| | | | 99/280 |

\* cited by examiner

BREWING ARRANGEMENT AND PORTABLE COFFEE MACHINE

BACKGROUND OF THE PRESENT INVENTION

Field of Invention

The present invention relates to the field of portable electrical appliance, and more particularly to a brewing arrangement and portable coffee machine.

Description of Related Arts

With the development of the times and the progress of science and technology, people's living standards are getting higher and higher. Nowadays, coffee and various beverages are gradually entering people's lives. Coffee products are generally served and packaged in small bags or cans, so that people need to use special brewing machines to brew out the coffee of favoured quality. As another choice, people may directly buy semi-finished products to brew them with boiled water, but the taste of finished coffee is poor, and the process of using coffee powder to be brewed directly with boiled water is difficult to completely release the elements in the coffee powder, resulting in insufficient taste of the coffee and affecting the taste experience of the drinker. In addition, the conventional equipment specifically used for coffee brewing is relatively large in size, and it is not convenient to carry during business trip or traveling.

Furthermore, the current portable coffee machine does not employ a filtering device or the filtering device is relatively simple, resulting in slow coffee filtering speed or insufficient filtering, which in turn affects the coffee extraction efficiency.

SUMMARY OF THE PRESENT INVENTION

An object of the present invention is to provide a brewing arrangement and portable coffee machine addressing the above mentioned disadvantages.

The present invention provides a brewing arrangement for portable coffee machine, comprising a brewing assembly and a powder pressing assembly, wherein the brewing assembly comprising a brewing cup having a brewing chamber, a lid detachably coupled to the brewing cup, and an adapter, wherein the brewing cup is detachably disposed in the adapter, wherein the powder pressing assembly comprises a powder presser for pressing coffee powder in the brewing chamber of the brewing cup before the coffee powder is brewed.

Preferably, the portable coffee machine comprises a main body and coffee receiving cup, wherein the adapter is arranged for being detachably assembled with the main body and the coffee receiving cup.

Preferably, the adapter has an inner cavity for receiving the brewing cup, an upper opening communicated to the inner cavity, and a lower opening communicated to the inner cavity.

Preferably, the adapter has a second protruding ring extended in the inner cavity for supporting the brewing cup.

Preferably, the brewing cup comprises a filter at a bottom thereof, wherein an inner wall and the filter defines the brewing chamber.

Preferably, the lid comprises a diffusion layer and has a receiving chamber above the diffusion layer, wherein the diffusion layer has multiple entering holes for communicating with the brewing chamber of the brewing cup.

Preferably, the lid comprises a first protruding ring in the receiving chamber and form a diffusion chamber above the diffusion layer, wherein the entering holes communicate the diffusion camber with the brewing chamber of the brewing cup.

Preferably, the brewing cup has a top circumferential edge, and the lid comprises an outer edge, wherein when the lid is assembled on the brewing cup, the top circumferential edge of the brewing cup is sandwiched between the adapter and the outer edge of the lid, wherein a filtering layer is disposed at a bottom of the lid.

Preferably, the powder pressing assembly further comprises a fixing ring which is arranged to be sleeved on the adapter to determine a stop position of the powder presser.

Preferably, the fixing ring comprises a clamping ring, wherein the adapter comprises threads for engaging with a main body of the portable coffee machine, wherein the clamping ring of the fixing ring is engaged with the threads of the adapter for adjusting a position of the fixing ring on the adapter.

Preferably, the powder presser comprises a presser head, a connector, and a hand holder, wherein a diameter of the presser head is matched with a diameter of the brewing chamber, wherein the connector is extended between the presser head and the hand holder.

Preferably, the presser head comprise multiple concentric protruding rings at a bottom thereof for pressing the coffee powder.

The present invention further provides a portable coffee machine, comprising:
 a main body comprising a water storage container and a water pump;
 a coffee receiving cup; and
 a brewing arrangement comprising:
 a brewing assembly having a brewing chamber; and
 a powder pressing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly.

Preferably, when the portable coffee machine is in travelling, the brewing assembly is assembled between the main body and the coffee receiving cup, the powder pressing assembly is disposed in one of the main body and the coffee receiving cup.

The present invention further provides a method of brewing coffee by a portable coffer machine, comprising the following steps.

(A) Configure a brewing assembly which is able to be detached from a main body for being filled with coffee powder in a brewing chamber.

(B) Allow the coffer powder to be pressed by a powder pressing assembly which is configured to be detachably coupled to the brewing assembly.

(C) Allow the brewing assembly to be detached from the powder pressing assembly and assembled between the main body and a coffer receiving cup.

(D) Feed boiled water in a water storage container of the main body into the brewing assembly by a water pump to brew the coffer powder, so as to provide liquid coffee product which is collected by a coffee receiving cup under the brewing assembly.

The above technical solution has the following advantages or beneficial effects:

1, the brewing arrangement and the portable coffee machine of the present invention are provided with a brewing cup, and a filter is arranged at the bottom of the brewing cup, the he upper and lower ends of the adapter are provided with openings, and the adapter is not provided with a bottom sealing plate, which can make the coffee liquid flow quickly into the brewing cup and improve the brewing efficiency.

2, the present invention relates to the brewing arrangement and the portable coffee machine which are provided with the powder pressing assembly which is capable of adjusting the concentration and taste of brewed coffee by applying pressure to the coffee powder before the brewing step.

3, the brewing arrangement and the portable coffee machine of the present invention are provided with a lid with a diffusion layer having multiple entering holes, a cavity is formed between the diffusion layer and the second protruding platform in the fixing base, so as to evenly diffuse the water flow in the main body into the brewing chamber through the cavity.

In the drawings: 1, brewing arrangement; 10, brewing assembly; 11, brewing cup; 110, top opening; 111, filter; 112, top circumferential edge; 113, inner wall; 114, brewing chamber; 12, lid; 1201, first region; 1202, second region; 121, diffusion layer; 122, outer edge; 123, first protruding platform; 124, entering hole; 125, filtering layer; 126, first protruding ring; 127, receiving chamber; 128, diffusion chamber; 13, adapter; 130, inner cavity; 1301, upper opening; 1302, lower opening; 131, second protruding ring; 132, friction pattern; 133, upper portion; 134, lower portion; 1341, enlarged annular portion; 1342, lower end; 135, threads; 14, powder pressing assembly; 141, powder presser; 1411, concentric protruding rings; 1412, presser head; 1413, connector; 1414, hand holder; 142, fixing ring; 1421, clamping ring; 1422, upper edge; 2, main body; 21, water storage container; 23, water pump; 24, fixing base; 241, second protruding platform; 242, first gasket; 243, second gasket; 244, water outlet hole; 245, cavity; 3, coffee receiving cup; 31, coffee receiving cavity; 32, cup opening.

DETAILED DESCRIPTION OF THE PREFERRED EMBODIMENT

To make the above objectives, features, and advantages of the present invention more apparent and understandable, a detailed description of specific embodiments of the present invention will be given below in conjunction with the accompanying drawings.

Embodiment 1

Figure 1:
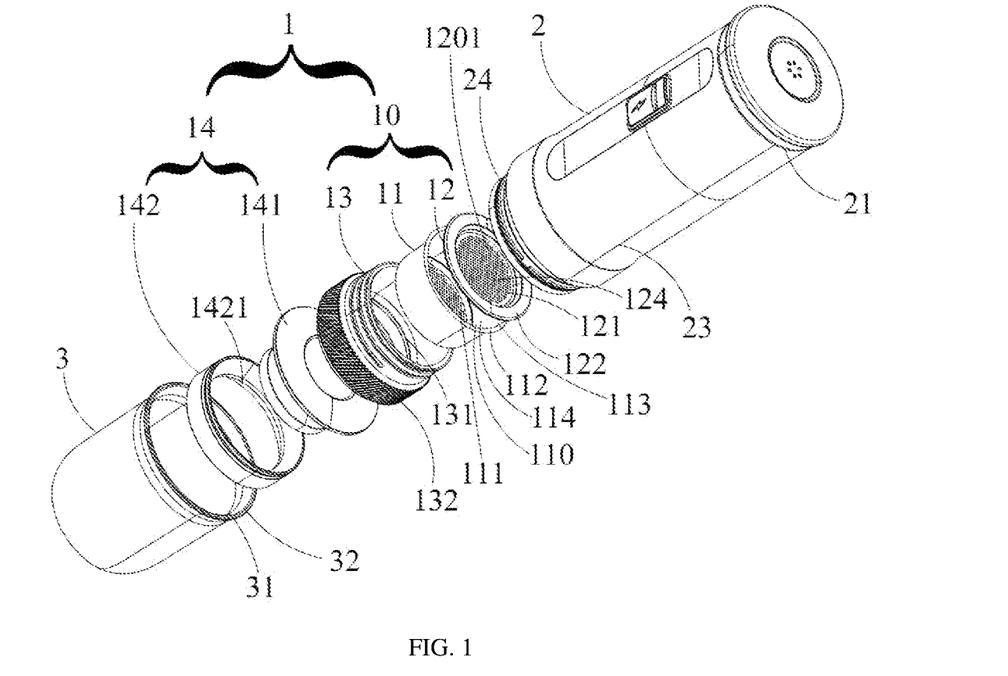
FIG. 1 is an exploded view of a portable coffee machine according to a first embodiment of the present invention.
Figure 2:
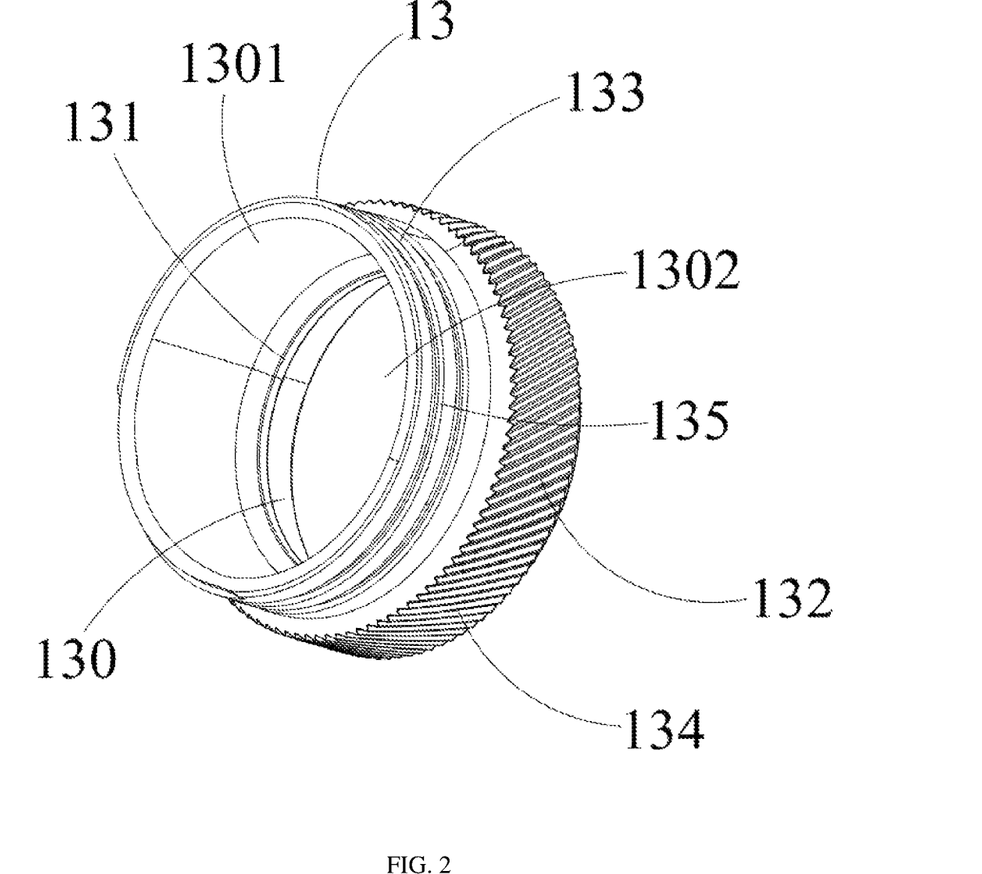
FIG. 2 is a perspective view of an adapter of the portable coffee machine according to the first embodiment of the present invention.
Figure 3:
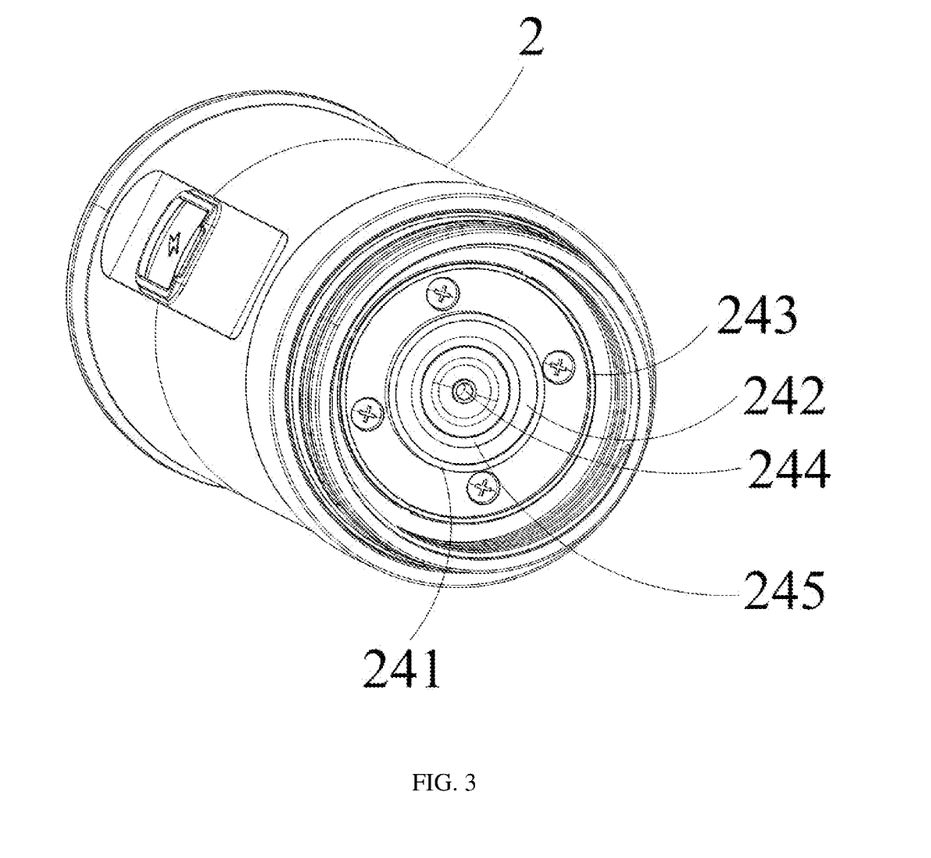
FIG. 3 is a perspective view of a main body of the portable coffee machine according to the first embodiment of the present invention.

With reference to FIGS. 1 to 3, a portable coffee machine and a brewing arrangement 1 according to a first embodiment is described. The brewing arrangement 1 comprises a brewing assembly 10 and a powder pressing assembly 14. The brewing assembly 10 comprises a brewing cup 11, a lid 12, and an adapter 13. The brewing cup 11 is detachably connected to the lid 12, and is positioned above the adapter 13. The powder pressing assembly 14 is positioned below the adapter 13 when the brewing arrangement 1 is assembled to an main body 2 of the portable coffee machine for easy carrying during travelling of the user. The bottom of the brewing cup 11 is provided with a filter 111, and the area of the filter 111 is greater than or equal to the area of a bottom opening of the brewing cup 11. The edge of the filter 111 is closely attached to an inner side of the brewing cup 11. The brewing cup 11 comprises a top circumferential edge 112 defining a top opening 110, an inner wall 113 of the brewing cup 11 and the filter 111 defines a brewing chamber 114 communicated to the top opening 110.

The lid 12 comprises a first region 1201 which is a first circular region, and a diffusion layer 121 is indented and formed in the first region 1201. The diffusion layer 121 is provided with multiple entering holes 124, and the area of the diffusion layer 121 is smaller than or equal to the area of the filter 111. The region outside the first region 1201 of the lid 12 forms an outer edge 122 of the lid. When the lid 12 is assembled to the brewing cup 11, the outer edge 122 of the lid 12 is attached to the top circumferential edge 112 of the brewing cup 11, the diffusion layer 121 of the lid 12 is extended into the brewing chamber 114. Both the diffusion layer 121 in the lid 12 and the filter 111 in the brewing cup 11 are provided with densely distributed small holes. While brewing the coffee powder by heated water from the main body 2 of the portable coffee machine by the brewing assembly 10, the water flow can quickly pass through the lid 12 and evenly enter the brewing chamber 114, so that the coffee powder in any position of the brewing chamber 114 can be fully extracted, and can flow out quickly from the filter 111 after the extraction is completed.

As shown in FIG. 2, the adapter 13 has an inner cavity 130, and an upper opening 1301 and a lower opening 1302 communicated to the inner cavity 130. The adapter 13 is connected to the brewing cup 11, and the top circumferential edge 112 of the brewing cup and the outer edge 122 of the lid 12 are positioned at the upper opening 1301 of the adapter 13, so that the adapter 13 supports the lid 12 and the brewing cup 11. The inner wall of the adapter 13 is provided with a second protruding ring 131 which is used to assist in receiving and supporting the brewing cup 11. The adapter 13 is provided with threads on the top at an outer wall thereof, and the adapter 13 is connected to the main body 2 of the portable coffee machine through the threads. The lower outer wall of the adapter 13 is provided with evenly distributed friction patterns 132 to increase friction, making it convenient for the user to grip thereon to connect and disassemble the adapter 13 with the main body 2. Alternatively, the filter 111 may be provided on the adapter 13.

The powder pressing assembly 14 comprises a powder presser 141 and a fixing ring 142. The top of the powder presser 141 is umbrella-shaped, the middle part is a slender cylinder, and the bottom part is wide and thick cylinder. The top surface area of the powder presser 141 is larger than the bottom end area of the powder presser 141. The powder presser 141 is used to compact the coffee powder, so as to adjust the extraction degree and the concentration of the finished coffee product.

The portable coffee machine comprises the above brewing assembly 10 and the powder pressing assembly 14 which can be made of metal or plastic, and further comprises the main body 2 and a coffee receiving cup 3, wherein the main body 2, the brewing arrangement 1, and the coffee receiving cup 3 are connected in sequence.

As shown in FIG. 1, the main body 2 comprises a water storage container 21 and a water pump 23. The water storage container 21 is used to store water for brewing the coffee powder, and the water pump 23 is used to pump water from the water storage container 21 into the brewing device. The main body 2 also comprises a fixing base 24 which is located at the bottom of the main body 2. As shown in FIG. 3, the fixing base 24 has a second protruding platform 241 at a center area to form a cavity between the second protruding platform 241 and the diffusion layer 121. The second protruding platform 241 has a water outlet hole 244 at the center, and when water flows out from the water outlet hole 244 at the center of the second protruding platform 241, the water diffuses into the cavity and uniformly flows into the brewing chamber 114 along the small entering holes 124 in the diffusion layer 121. The second protruding platform 241 is equipped with a first gasket 242 to prevent water leakage at the first region 1201, and a second gasket 243 is provided at an outer side of the second protruding platform 241 on the fixing base 24 to prevent water leakage at the outer edge 122 of the lid 12 when the lid 12 is attached to the fixing base 24.

Figure 6:
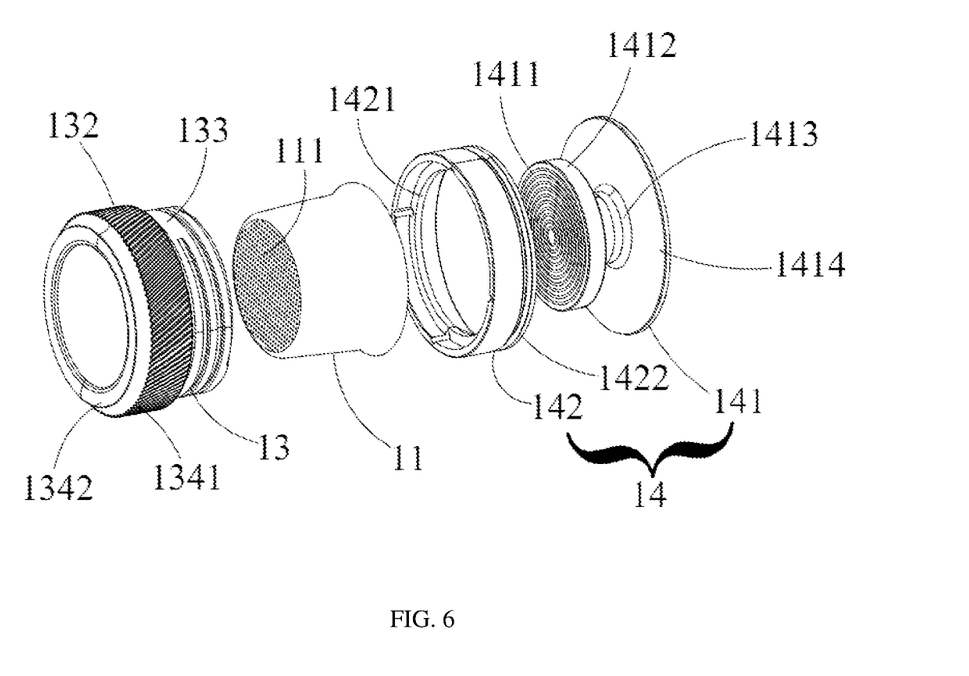
FIG. 6 is a perspective view illustrating the brewing arrangement of the portable coffee machine being used for pressing the coffee powder by the powder pressing assembly, the brewing cup and the supporter according to the second embodiment of the present invention.

As shown in FIG. 6, when the powder presser 141 is used for powder pressing, the fixing ring 142 is sleeved on a top end portion of the adapter 13 to prevent the powder from splashing or leakage during powder pressing. The fixing ring 142 is provided with a clamping ring 1421, which is used to fix the position of the fixing ring 142 and prevent the fixing ring 142 from automatically sliding along the outer wall of the adapter 13. The bottom of the powder presser 141 is provided with multiple concentric protruding rings 1411 which are spaced from each other, and the powder presser 141 is extended into the fixing ring 142 and the brewing cup 11 to apply pressure to the coffee powder in the brewing cup 11, so as to adjust the gap between the particles of the coffee powder and adjust the final concentration of the finished coffee product.

Embodiment 2

Figure 4:
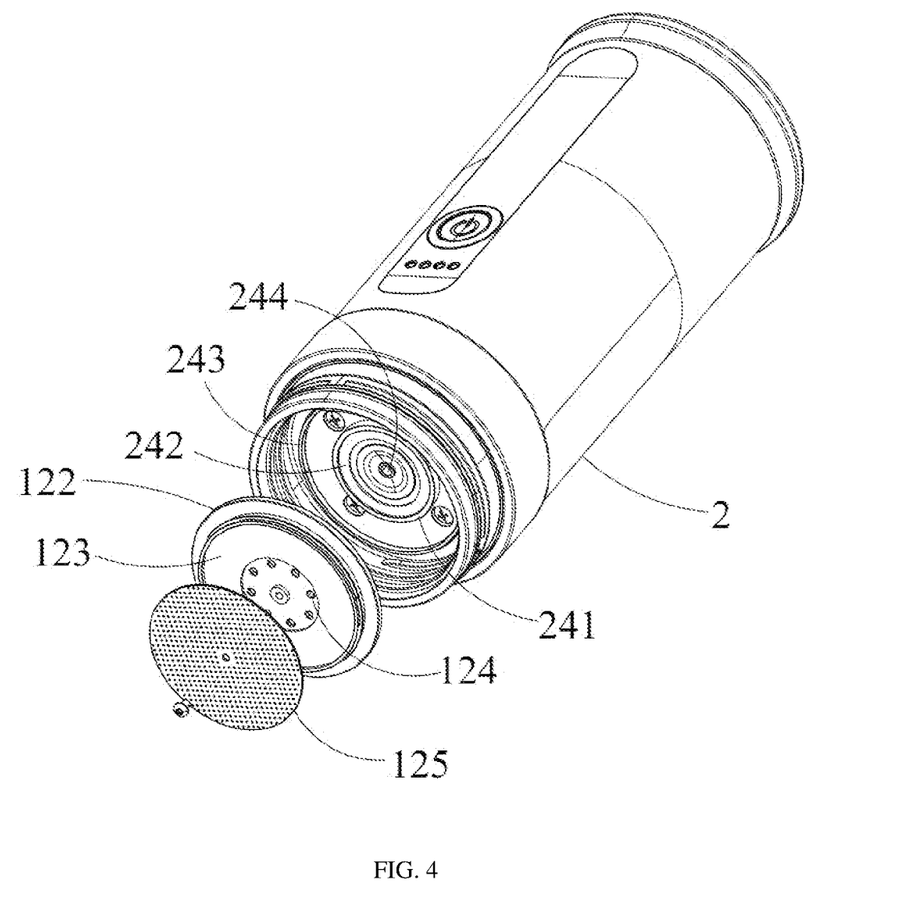
FIG. 4 is a perspective view of a main body and a lid of the portable coffee machine according to a second embodiment of the present invention.
Figure 5:
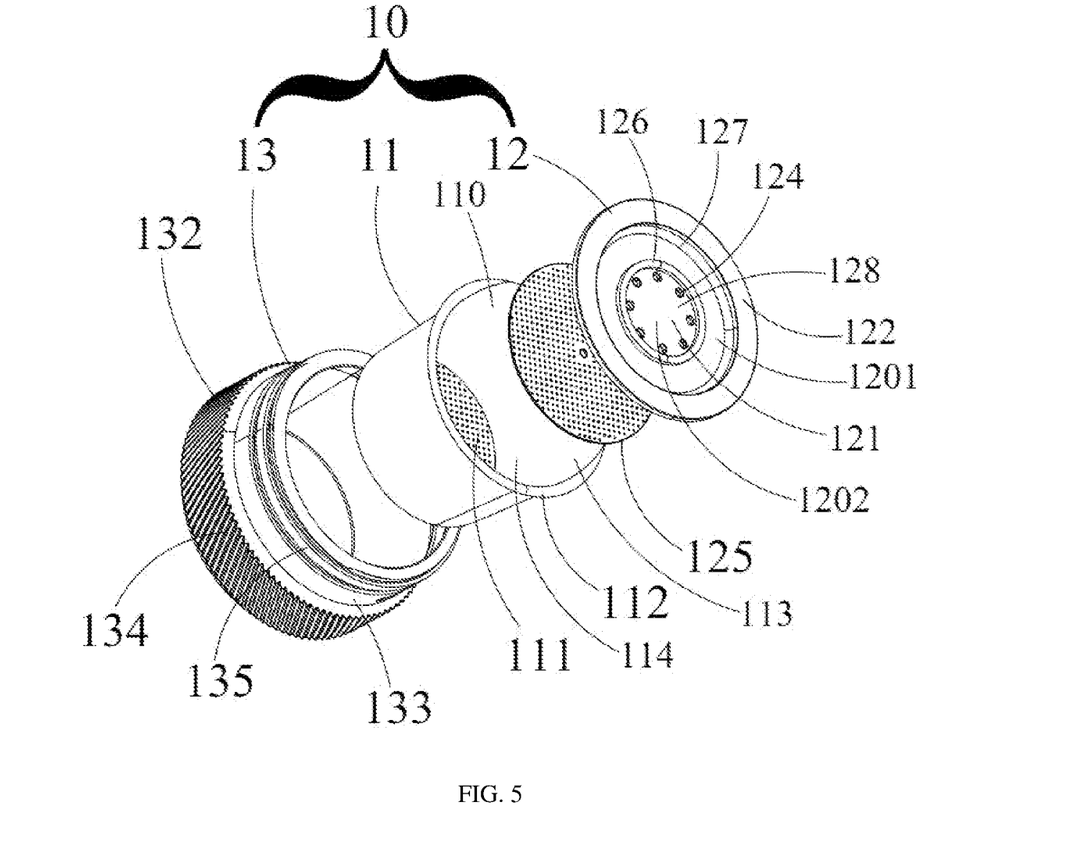
FIG. 5 is a perspective view of a brewing arrangement of the portable coffee machine according to the second embodiment of the present invention.

Referring to FIGS. 4 to 6, a portable coffee machine and a brewing arrangement 1 according to a second embodiment is shown to comprises a brewing cup 11, a lid 12, a adapter 13, and a powder pressing assembly 14. The brewing cup 11 is detachably coupled to the lid 12 and is located above the adapter 13. The powder pressing assembly 14 is located below the adapter 13 when the brewing arrangement 1 is assembled to an main body 2 of the portable coffee machine for easy carrying during travelling of the user. The bottom of the brewing cup 11 is provided with a filter 111. The brewing cup 11 comprises a top circumferential edge 112 defining a top opening 110, an inner wall 113 of the brewing cup 11 and the filter 111 define a brewing chamber 114 communicated to the top opening 110.

As shown in FIG. 4, the lid 12 comprises a first region 1201 which can be a first circular region. The first region is concave to form a diffusion layer 121, and a second region 1202 is provided within the first region 1201. The edge of the second region which can be a second circular region is formed with a first protruding ring 126. The area surrounded by the first protruding ring 126 forms the diffusion layer 121 which diffuses the water entering the lid 12. The diffusion layer 121 is provided with multiple entering holes 124, which are arranged along the circumference of the diffusion layer 121 to accelerate the flow rate of water. The bottom of the lid 12 is formed a first protruding platform 123, and a filtering layer 125 is provided below the first protruding platform 123. The filtering layer 125 is connected to the first protruding platform 123, for example, by screw connection.

In the above first embodiment, the diffusion layer 121 in the lid 12 has a larger area, which can make the water flow diffuse faster. In this embodiment, by setting the diffusion layer 121 and the filtering layer 125, the water flow can have a longer buffering time, which can avoid leakage and make the water flow into the brewing cup 11 more evenly and gently.

The portable coffee machine of this embodiment comprises the brewing arrangement 1, the main body 2 and the coffee receiving cup 3. The main body 2 and the coffee receiving cup 3 are the same as shown in FIG. 1 of the first embodiment, wherein the main body 2, the brewing arrangement 1, and the coffee receiving cup 3 are connected in sequence. As shown in FIG. 4, the main body 2 comprises a fixing base 24, which is located at the bottom of the main body 2. The center area of the fixing base 24 is provided with a second protruding platform 241, and the center of the second protruding platform 241 is provided with a water outlet hole 244. The water flow of the main body 2 enters the lid 12 through the water outlet hole 244. A first gasket 242 is provided on the second protruding platform 241 to prevent water leakage at the first protruding ring 126. A second gasket 243 is provided at an outside of the second protruding platform 241 on the fixing base 24. When the lid 12 is assembled to the fixing base 24, the second gasket 243 can prevent water leakage at the outer edge 122 of the lid.

As shown in FIG. 5, the adapter 13 has an inner cavity 130, and an upper opening 1301 and a lower opening 1302 communicated to the inner cavity 130. The adapter 13 is connected to the brewing cup 11 by screws, and the top circumferential edge 112 of the brewing cup and the outer edge 122 of the lid 12 are positioned at the upper opening 1301 of the adapter 13, so that the adapter 13 supports the lid 12 and the brewing cup 11. The inner wall at a lower portion of the adapter 13 is extended inwardly to reduce an inner diameter thereof to assist in receiving and supporting the brewing cup 11. The lower outer wall of the adapter 13 is provided with evenly distributed friction patterns 132 to increase friction, making it convenient for the user to grip thereon to connect and disassemble the adapter 13 with the main body 2.

As shown in FIG. 6, the powder pressing assembly 14 comprises a powder presser 141 and a fixing ring 142. The top of the powder presser 141 is umbrella-shaped, the middle part is a slender cylinder, and the bottom part is wide and thick cylinder. The top surface area of the powder presser 141 is larger than the bottom end area of the powder presser 141. The powder presser 141 is used to compact the coffee powder, so as to adjust the extraction degree and the concentration of the finished coffee product.

When the powder presser 141 is used for powder pressing, the fixing ring 142 is sleeved on a top end portion of the adapter 13 to prevent the powder from splashing or leakage during powder pressing. The fixing ring 142 is provided with a clamping ring 1421, which is used to fix the position of the fixing ring 142 and prevent the fixing ring 142 from automatically sliding along the outer wall of the adapter 13. The bottom of the powder presser 141 is provided with multiple concentric protruding rings 1411 which are spaced from each other, and the powder presser 141 is extended into the fixing ring 142 and the brewing cup 11 to apply pressure to the coffee powder in the brewing cup 11, so as to adjust the gap between the particles of the coffee powder and adjust the final concentration of the finished coffee product.

Referring to FIGS. 1 to 6, the present invention provides a method for brewing coffee by the portable coffee machine, wherein the method comprises a powder pressing step and a coffee brewing step.

In the powder pressing step, the powder pressing assembly 14 and the brewing assembly is used for pressing the coffee powder received in the brewing cup 11 of the brewing assembly 10.

More specifically, during travelling of the user, the user may carry the portable coffee machine which comprises the brewing arrangement 1, the main body 2 and the coffee receiving cup 3. Accordingly, the brewing arrangement 1 can be assembled with the main body 2 and the coffee receiving cup 3 during travelling. More specifically, the brewing arrangement 1 comprises the brewing assembly 10 and the powder pressing assembly 14, the brewing assembly 10 can be detachably assembled between the main body 2 and the coffee receiving cup 3, the powder pressing assembly 14 is disposed in the coffee receiving cup 3 below the brewing assembly 10. Alternatively, the powder pressing assembly 14 may also disposed in the water storage container 21 of the main body 2. It also can be understood that the components of the portable coffee machine may be separated from each other and are stored in one or more bags or casings.

According to the present invention, preferably, the brewing assembly 10 is assembled between the main body 2 and the coffee receiving cup 3 during travelling. The brewing assembly comprises the brewing cup 11, the lid 12 and the adapter 13. The brewing cup 11 has the brewing chamber 114 for being filled with coffee powder which will be brewed by the boiled water from the main body 2, the lid 12 is covered on the brewing cup 12 to seal the top opening 110 of the brewing cup 11, the adapter 13 is used for coupling with the main body 2 and the coffee receiving cup 3 of the portable coffee machine.

The adapter 13 has the inner cavity 130 for receiving the brewing cup 11. Accordingly, the brewing cup 11 can be disposed in the inner cavity 130 of the adapter 13 through the upper opening 1301, as shown in FIG. 2, the second protruding ring 131 protruded from an inner wall of the adapter 13 in the inner cavity 130 can be used to support the brewing cup 11 in a manner that the bottom end of the brewing cup 11 is biasing against the second protruding ring 131 of the adapter 13.

The adapter 13 comprises an upper portion 133 and a lower portion 134 integrally extended from the upper portion 133. As shown in FIG. 2, in this embodiment, a diameter of the lower portion 134 is larger than a diameter of the upper portion 133. The upper portion 133 can be detachably mounted with the main body 2. For example, the upper portion 133 is provided with a plurality of threads 135 at an outer surface thereof, the bottom of the main body 2 is provided with inner threads at the fixing base 24 for engaging with the threads 135 of the upper portion 133 of the adapter 13.

The lower portion 134 is provided with an enlarged annular portion 1341 with the friction patterns 132 to increase friction at the out surface thereof and a lower end portion 1342 which can be fitted into the coffee receiving cup 3. The fixing base 24 of the main body 2 is seated on the enlarged annular portion 1341 of the lower portion 134 which is supported on the coffee receiving cup 3.

The coffee receiving cup 3 has a coffee receiving cavity 31 and a cup opening 32 communicated to the coffee receiving cavity 31, the brewing assembly 10 can be disposed on the coffee receiving cup 3 at the cup opening 32 in such a manner that a top edge 33 of the coffee receiving cup 3 is sleeved on the lower end portion 1342 and is configured to allow the brewed coffee liquid in the brewing chamber 114 to pass through the filter 111 which can be a filter mesh to enter the coffee receiving cavity 31.

Accordingly, in the powder pressing step, the brewing assembly 10 is detached from the main body 2 and the coffee receiving cup 3. More specifically, the lid 12 of the brewing assembly 10 is detached from the fixing base 24 of the main body 2, and the adapter 13 is disengaged with the coffee receiving cup 3. The powder pressing assembly 14 which may be disposed in the coffee receiving cup 3 under the brewing assembly 10 is taken out from the coffee receiving cup 3.

And then, with referring to FIG. 6, the lid 12 of the brewing assembly 10 is detached from the brewing cup 11 which is received in the adapter 13. Coffee powder can then be filled into the brewing chamber 114 of the brewing cup 11 through the top opening 110 of the brewing cup 11. The fixing ring 142 of the powder pressing assembly 14 is sleeved and supported on the upper portion 133 of the adapter 13, and the powder presser 141 is disposed into the brewing chamber 114 of the brewing cup 11 for pressing the coffee powder in the brewing chamber 114 of the brewing cup 11.

The powder presser 141 comprises a presser head 1412, a connector 1413, and a hand holder 1414. A bottom end of the powder head 1412 is provided with the multiple concentric protruding rings 1411, and the protruding rings 1411 are spaced from each other, so as to enhance the powder pressing performance. A diameter of the presser head 1412 which is circular in shape is matched with a diameter of the brewing chamber 114 of the brewing cup 11. The hand holder 1414 can be circular in shape and used for a hand of the user to hold on for applying a pressing force. The connector 1413, which is extended between the presser head 1412 and the hand holder 1414, is preferred to have a diameter smaller that the diameters of the presser head 1412 and the hand holder 1414, so as to facilitate the fingers of the users to hold on the powder presser 141.

The fixing ring 142 of the powder pressing assembly 14 comprising a clamping ring 1421 which can be engaged with the threads 135 of the upper portion 133 of the adapter 13, so that the fixing ring 142 cannot automatically slide along the upper portion 133 of the adapter 13. When the fixing ring 142 is assembled on the adapter 13, an upper edge 1422 of the fixing ring 142 is protruded from the upper portion 133 of the adapter 13 and the top circumferential edge 112 of the brewing cup 11. When the powder presser 141 is used to press the coffee powder in the brewing cup 11, the hand holder 1414 is stopped and biasing against the upper edge 1422 of the fixing ring 142 on the upper portion 133 of the adapter 13. Accordingly, a position of the clamping ring 1421 on the threads 135 of the upper portion 133 of the adapter 13 can be adjusted by rotating the fixing ring 142, so that the position of the upper edge 1422 of the fixing ring 142 can be adjusted, and thus the depth of the presser head 1412 in the brewing chamber 114 of the brewing cup 11 is adjusted, so as to provide different powder pressing performances for meeting the user's need.

After the powder pressing step, the fixing ring 142 is detached from the adapter 13 and then the adapter 13 and the brewing cup 11 are assembled to the main body 2 and the coffee receiving cup 11 for coffee brewing.

More specifically, in the coffee brewing step, the lid 12 is assembled to the brewing cup 11 and the adapter 13 is engaged with the fixing base 24 of the main body 2. The first gasket 242 and the second gasket 243 are made of resilient material so as to enhance a sealing performance to prevent the leakage of water. The lid 12 has a receiving chamber 127 above the diffusion layer 121 for communicating with the water outlet hole 244 of the fixing base 24 of main body 2, and when the adapter 13 is mounted to the fixing base 24, the receiving chamber 127 is retained between the fixing base 24 and the lid 12, and the water entering the receiving chamber 127 is prevented from leakage by the second gasket 243. In addition, as shown in FIG. 5 of the drawings, a diffusion chamber 128, which may be formed by the first protruding ring 126, is at a central area of the receiving chamber 127 and is communicated with the entering holes 124, and the water entering the diffusion chamber 128 is prevented from leakage by the first gasket 243 which is sandwiched between the fixing base 24 and the first protruding ring 126.

The boiled water can be discharged through the water outlet hole 244 into the lid 12 and pass through the entering holes 124 of the diffusion layer 121 to enter the brewing chamber 114 of the brewing cup 11 between the filter 111 and the inner wall 113 of the brewing cup 11, so that the boiled water is mixed with the pressed coffee powder stored in the brewing chamber 114 of the brewing cup 11, and the coffee liquid pass through the filter 111 and enter the coffee receiving cup 11. And after the coffee receiving cup 11 has collected the finished coffee product, the user is able to detach the coffee receiving cup 11 from the adapter 13 of the brewing assembly 10, so as to drink the coffee of high quality and favoured taste.

Accordingly, boiled water can be filled into the water storage container 21 of the main body 2 and the boiled water is pumped into the brewing cup 11 of the brewing assembly 10 through the water outlet hole 244 of the fixing base 24 of main body 2 by the water pump 23. Alternatively, the main body 2 is provided with the heating assembly, so that when water is filled into the water storage container 21 of the main body 2, the heating assembly can be activated to heat the water into boiled water which is then pumped by the water pump 23, so that the boiled water is fed into the brewing cup 11 of the brewing assembly 10 for brewing the coffee powder in the brewing cup 11.

The above description is only the disclosure of the preferred embodiment of the present invention, and the implementation and scope of the present invention should not be limited thereto. Those skilled in the art should be able to realize that any equivalent substitution and obvious modification made based on the disclosure and illustrations of the present invention are within the scope of the present invention.

In the description of the present invention, it should be understood that the terms "up", "down", "front", "back", etc. indicating the orientation or positional relationship are based on the orientation or positional relationship shown in the drawings, and are only for the purpose of facilitating the description and simplifying the description of the present invention, and do not indicate or imply that the device or element referred to must have a specific orientation, must be constructed and operated in a specific orientation, and therefore should not be interpreted as limitations of the present invention.

What is claimed is:

1. A brewing arrangement for portable coffee machine, comprising:
   a brewing assembly comprising a brewing cup having a brewing chamber, a lid detachably coupled to the brewing cup, and an adapter, wherein the brewing cup is detachably disposed in the adapter; and
   a powder pressing assembly detachably coupled with the brewing assembly,
   wherein the powder pressing assembly comprises a powder presser for pressing coffee powder in the brewing chamber of the brewing cup before the coffee powder is brewed,
   wherein after the coffee powder has been pressed, the powder pressing assembly is detached from the brewing assembly;
   wherein the brewing cup comprises a filter at a bottom thereof, wherein an inner wall and the filter defines the brewing chamber.

2. A brewing arrangement for portable coffee machine, comprising:
   a brewing assembly comprising a brewing cup having a brewing chamber, a lid detachably coupled to the brewing cup, and an adapter, wherein the brewing cup is detachably disposed in the adapter; and
   a powder pressing assembly detachably coupled with the brewing assembly,
   wherein the powder pressing assembly comprises a powder presser for pressing coffee powder in the brewing chamber of the brewing cup before the coffee powder is brewed,
   wherein after the coffee powder has been pressed, the powder pressing assembly is detached from the brewing assembly;
   wherein the powder pressing assembly further comprises a fixing ring which is arranged to be sleeved on the adapter to determine a stop position of the powder presser.

3. The brewing arrangement according to claim 2, wherein the fixing ring comprises a clamping ring, wherein the adapter comprises threads for engaging with a main body of the portable coffee machine, wherein the clamping ring of the fixing ring is engaged with the threads of the adapter for adjusting a position of the fixing ring on the adapter.

4. The brewing arrangement according to claim 3, wherein the powder presser comprises a presser head, a connector, and a hand holder, wherein a diameter of the presser head is matched with a diameter of the brewing chamber, wherein the connector is extended between the presser head and the hand holder.

5. The brewing arrangement according to claim 3, wherein the presser head comprise multiple concentric protruding rings at a bottom thereof for pressing the coffee powder.

6. A portable coffee machine, comprising:
   a main body comprising a water storage container and a water pump;
   a coffee receiving cup; and a brewing arrangement comprising:

a brewing assembly having a brewing chamber; and a powder pressing assembly detachably coupled with the brewing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly;

wherein the brewing assembly comprises a brewing cup having the brewing chamber, a lid detachably coupled to the brewing cup, and an adapter, wherein the brewing cup is detachably disposed in the adapter which is arranged for being detachably assembled with the main body and the coffee receiving cup, wherein the powder pressing assembly is capable of being located below the adapter and within the coffee receiving cup when the brewing arrangement is assembled to the main body of the portable coffee machine for easy carrying;

wherein the lid comprises a diffusion layer and has a receiving chamber above the diffusion layer, wherein the diffusion layer has multiple entering holes for communicating with the brewing chamber of the brewing cup, wherein the lid comprises a first protruding ring in the receiving chamber and form a diffusion chamber above the diffusion layer, wherein the entering holes communicate the diffusion camber with the brewing chamber of the brewing cup;

wherein the adapter has an inner cavity for receiving the brewing cup, an upper opening communicated to the inner cavity, and a lower opening communicated to the inner cavity, wherein the adapter has a second protruding ring extended in the inner cavity for supporting the brewing cup.

7. A portable coffee machine, comprising:

a main body comprising a water storage container and a water pump;

a coffee receiving cup; and a brewing arrangement comprising:

a brewing assembly having a brewing chamber; and a powder pressing assembly detachably coupled with the brewing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly;

wherein the brewing assembly comprises a brewing cup having the brewing chamber, a lid detachably coupled to the brewing cup, and an adapter, wherein the brewing cup is detachably disposed in the adapter which is arranged for being detachably assembled with the main body and the coffee receiving cup, wherein the powder pressing assembly is capable of being located below the adapter and within the coffee receiving cup when the brewing arrangement is assembled to the main body of the portable coffee machine for easy carrying;

wherein the brewing cup comprises a filter at a bottom thereof, wherein an inner wall and the filter defines the brewing chamber.

8. A portable coffee machine, comprising:

a main body comprising a water storage container and a water pump;

a coffee receiving cup; and a brewing arrangement comprising:

a brewing assembly having a brewing chamber; and a powder pressing assembly detachably coupled with the brewing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly;

wherein the brewing assembly comprises a brewing cup having the brewing chamber, a lid detachably coupled to the brewing cup, and an adapter, wherein the brewing cup is detachably disposed in the adapter which is arranged for being detachably assembled with the main body and the coffee receiving cup, wherein the powder pressing assembly is capable of being located below the adapter and within the coffee receiving cup when the brewing arrangement is assembled to the main body of the portable coffee machine for easy carrying;

wherein the lid comprises a diffusion layer and has a receiving chamber above the diffusion layer, wherein the diffusion layer has multiple entering holes for communicating with the brewing chamber of the brewing cup, wherein the lid comprises a first protruding ring in the receiving chamber and form a diffusion chamber above the diffusion layer, wherein the entering holes communicate the diffusion camber with the brewing chamber of the brewing cup.

9. A portable coffee machine, comprising:

a main body comprising a water storage container and a water pump;

a coffee receiving cup; and a brewing arrangement comprising:

a brewing assembly having a brewing chamber; and a powder pressing assembly detachably coupled with the brewing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly;

wherein the brewing assembly comprises a brewing cup having the brewing chamber, a lid detachably coupled to the brewing cup, and an adapter, wherein the brewing cup is detachably disposed in the adapter which is arranged for being detachably assembled with the main body and the coffee receiving cup, wherein the powder pressing assembly is capable of being located below the adapter and within the coffee receiving cup when the brewing arrangement is assembled to the main body of the portable coffee machine for easy carrying;

wherein the brewing cup has a top circumferential edge, and the lid comprises an outer edge, wherein when the lid is assembled on the brewing cup, the top circumferential edge of the brewing cup is sandwiched between the adapter and the outer edge of the lid.

10. The portable coffee machine according to claim 8, wherein the main body comprising a fixing base at a bottom thereof, wherein the fixing base comprises a second protruding platform at a center area to form a cavity between the second protruding platform and the diffusion layer, the second protruding platform has a water outlet hole at a center, and when the boiled water flows out from the water outlet hole, the boiled water diffuses into the cavity and uniformly flows into the brewing chamber along the entering holes in the diffusion layer, wherein the second protruding platform is equipped with a first gasket, and a second gasket is provided corresponding an outer edge of the lid.

11. A portable coffee machine, comprising:
a main body comprising a water storage container and a water pump;
a coffee receiving cup; and
a brewing arrangement comprising:
a brewing assembly having a brewing chamber; and
a powder pressing assembly detachably coupled with the brewing assembly for pressing coffee powder in the brewing chamber, wherein after the coffee powder in the brewing chamber is pressed by the powder presser, the powder pressing assembly is detached from the brewing assembly, and the brewing assembly is then assembled between the main body and the coffee receiving cup, so as to allow boiled water in the water storage container to be pumped into the brewing assembly by the water pump to brew the coffer powder, so as to provide liquid coffee product which is collected by the coffee receiving cup under the brewing assembly;

wherein the brewing assembly comprises a brewing cup having the brewing chamber, a lid detachably coupled to the brewing cup, and an adapter, wherein the brewing cup is detachably disposed in the adapter which is arranged for being detachably assembled with the main body and the coffee receiving cup, wherein the powder pressing assembly is capable of being located below the adapter and within the coffee receiving cup when the brewing arrangement is assembled to the main body of the portable coffee machine for easy carrying;

wherein the powder pressing assembly further comprises a powder presser and a fixing ring which is arranged to be sleeved on the adapter to determine a stop position of the powder presser.

12. The portable coffee machine according to claim 11, wherein the fixing ring comprises a clamping ring, wherein the adapter comprises threads for engaging with the main body, wherein the clamping ring of the fixing ring is engaged with the threads of the adapter for adjusting a position of the fixing ring on the adapter.

13. The portable coffee machine according to claim 12, wherein the powder presser comprises a presser head, a connector, and a hand holder, wherein a diameter of the presser head is matched with a diameter of the brewing chamber, wherein the connector is extended between the presser head and the hand holder.

* * * * *